Aug. 9, 1938.  G. VALERY ET AL  2,126,062

BRAKE MECHANISM FOR TRAILERS

Filed April 29, 1937

INVENTOR
Gilbert Valery and
William Valery
BY
Harry Radzinsky
ATTORNEY

Patented Aug. 9, 1938

2,126,062

UNITED STATES PATENT OFFICE 2,126,062

BRAKE MECHANISM FOR TRAILERS

Gilbert Valery and William Valery, New Rochelle, N. Y.

Application April 29, 1937, Serial No. 139,635

2 Claims. (Cl. 188—3)

This invention relates to an improvement in brakes for automotive trailers and has for its object the provision of a hydraulic brake mechanism for the trailer which will detachably connect into the car brake system and be synchronized therewith whereby the application of the brake on the car will simultaneously apply the brakes on the trailer.

A further object of the invention is the provision of a brake mechanism of the character described wherein a speedy coupling and uncoupling of the trailer brake mechanism with that of the towing car is had to thereby enable the trailer to be coupled and uncoupled in an expeditious manner without requiring time-consuming operations necessary to disconnect the trailer brake system from that of the car.

Another object of the invention is to provide a trailer brake system arranged for coupling with that on the car and wherein the trailer brake system does not in any manner minimize the effectiveness of the car brake system both when the trailer is coupled to and uncoupled from the car.

More particularly, the invention contemplates the provision of a trailer brake mechanism including a cylinder containing a fluid-actuating piston, said cylinder and piston arranged for detachable connection to a similar piston and cylinder on the towing car, the latter piston being moved by actuation of the car brake pedal, said piston in turn moving the piston of the trailer brake mechanism to cause the same to apply the trailer brakes when the car brakes are being applied.

These and other objects are accomplished by the invention, a more particular description of which appears hereafter and is pointed out in the claims appended hereto.

Figure 1:
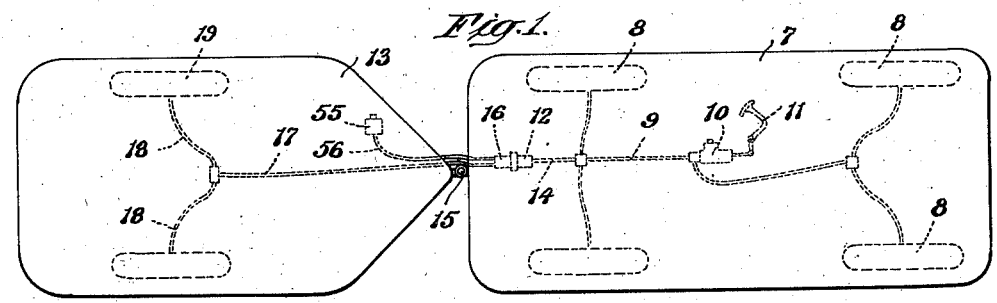
Figure 2:
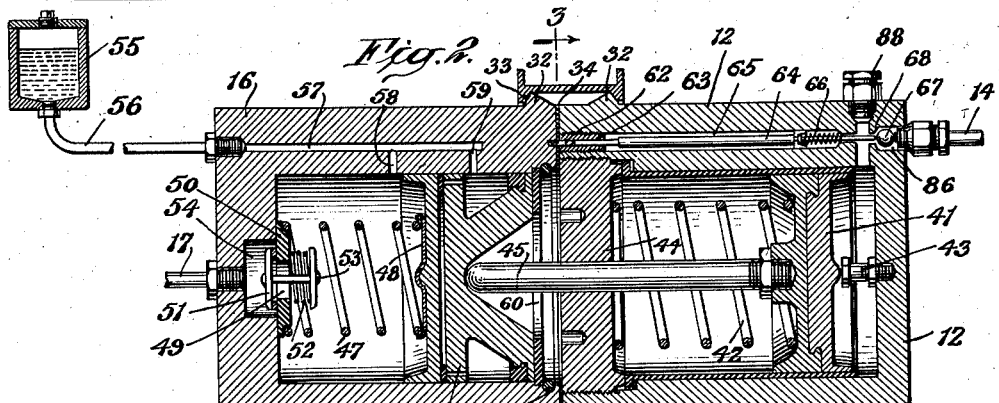
Figures 3, 4:
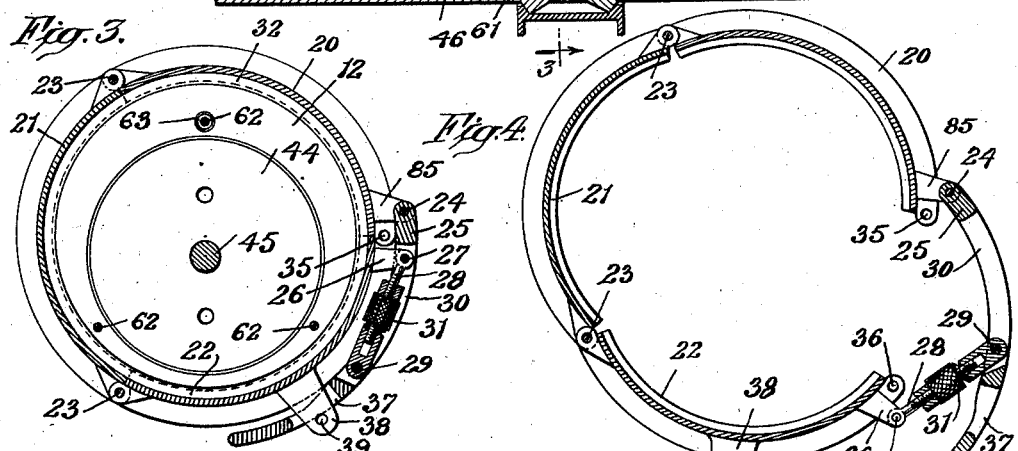
Figures 5, 6:
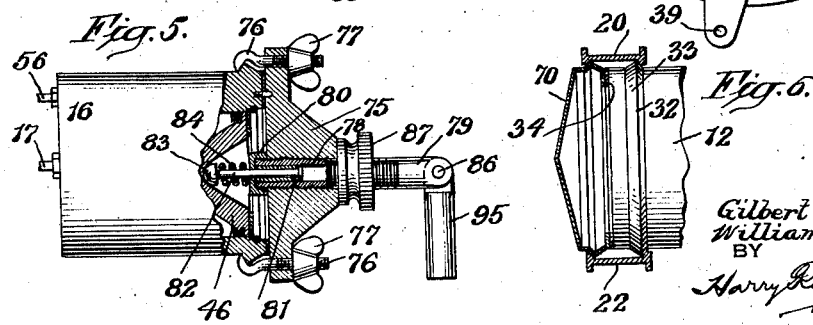

In the accompanying drawing forming a part hereof, Fig. 1 is a diagrammatic view of a car and attached trailer, showing the manner in which the car brake system and the trailer brake system are coupled together; Fig. 2 is a sectional view through the coupling member or cylinders; Fig. 3 is a sectional view on the line 3—3 of Fig. 2, looking in the direction of the arrows; Fig. 4 is a front view of the clamping member which connects the two parts of the cylinder shown in Fig. 2, together; Fig. 5 is a side elevation, with parts in section, of the portion of the cylinder which is attached to the trailer, disconnected from that portion which is attached to the car, and provided with means for maintaining the brakes of the trailer in position of application while the trailer is uncoupled from the car; and Fig. 6 shows the portion of the cylinder that is located on the car closed by a dust cap.

In Fig. 1 of the drawing, an automobile or towing car is indicated at 7; the same having the conventional four wheels indicated at 8, the wheels being provided with the usual hydraulic brakes, connected by the system of tubing 9 to the so-called "master cylinder" 10 which is in turn connected to the foot pedal 11 in the known manner. All of the elements thus far described are in general use on most motor cars manufactured at the present time.

Mounted at the rear end of the car and preferably at a convenient position on the chassis, is a part of the coupling member 12 in the form of a cylinder, said cylinder being connected into the system of tubing 9 by the tube 14 and thereby forming part of the brake mechanism of the car. The trailer is diagrammatically indicated at 13 and is coupled to the car by the usual pivotal coupling 15. The trailer brake mechanism includes cylindrical coupling member 16 of the same general shape as the cylinder 12 and arranged to be connected to the end of the same in the manner indicated in Fig. 2 when the trailer is coupled to the car. Cylinder 16 connects by flexible tubing 17 to the tubes 18 which extend to hydraulic brakes of conventional construction provided on the wheels 19 of the trailer, said brakes being more or less similar to those employed on the car.

When the trailer is coupled to the car, the front end of cylinder 16 connects to the rear end of cylinder 12 in the manner indicated in Fig. 2. For joining the two cylinders together in the manner indicated, the clamp shown in Figs. 3 and 4 or a similar connection may be employed. Said clamp comprises a plurality of segments 20, 21 and 22 pivotally connected together at the points 23. The end of segment 20 is provided with a pair of lugs 85 between which one end of a locking lever 25 is pivoted at 24. The end of the segment 22 is provided with similar lugs 26 between which the end of an adjustable link member 22 is pivoted at 28, said link having its opposite end pivoted at 29 between the sides of an elongated slot or aperture 30 formed in the locking lever 25. The knurled nut 31 enables the length of link 28 to be adjusted to enable the clamp to close to the extent required to cause the two cylinders 12 and 16 to be held securely end to end. To cause the clamp to draw the ends of the cylinders 16 and 12 toward one another and hold them tightly together, each of the cylinders is provided near its end with a circumferential rib 32, said ribs each having an inclined face 33, said faces on the ribs being engaged by similar inclined faces on the inside of clamp segments 20, 21 and 22 so that when the clamp segments are brought together in closed position, as shown in Fig. 3, the inclined surfaces 33 on the ribs will be engaged by the complementary surfaces on the inside of the clamp segments and a cam action exerted to draw the ends of cylinders 12 and 16 toward one another in close contact. To ensure a tight fit between cylinder portions 12 and 16, the end of cylinder 12 is provided with a gasket 34 against which the end of cylinder 16 abuts when cylinders 12 and 16 are placed together in cooperative relationship as shown in Fig. 2.

In Fig. 4 the clamp is shown in its open position. To close it, the locking lever 30 is swung upward (as viewed in Fig. 4) this action drawing segment 20 and segment 22 together to cause the ends of the same to meet. The end of segment 20 is provided with an eye 35 similar to an eye 36 formed on the end of segment 22. When the two segments 20 and 22 are brought together, the eyes 35 and 36 are aligned and a suitable locking pin may be inserted, if desired, through the aligned eyes. Then locking lever 30 is swung downwardly into locked position as shown in Fig. 3, this action causing link 28 and its lugs 26 to extend into slot 30 in the locking lever. The locking lever 25 is provided with an aperture 37 through which a lug 38 formed on segment 23 projects when the lever is in its closed position. Lug 38 is formed with a hole 39 near its free end for the reception of a lock, which when inserted through the hole 39, will hold the clamp in its locked position. Through the clamp described, cylinder 16 may be instantly coupled with cylinder 17 or as speedily uncoupled when required. Thus, when the trailer 13 is uncoupled from the car, the connection of the trailer braking system with the car brake system is one which can be almost instantly disconnected.

Cylinder 12 is provided with a lining member 40 as is customary in brake cylinders of this character, and mounted for reciprocation within lining member 40 is a piston 41 which is normally spring-pressed toward the right, as viewed in Fig. 2, by the coil spring 42. An adjustable stop 43 secured in the end of the cylinder 12 limits the movement of the piston toward the right under pressure of the spring 42. The opposite end of the cylinder 12 is closed by a plug 44 and the piston 41 is provided with a centrally located push-rod 45 which projects through plug 44 and extends into cylinder 16 and bears against a piston 46 movable in said cylinder. A coil spring 47 has one end resting against a seat 48 formed on piston 46 and has its other end bearing against a disk 50 formed with an aperture 49 normally closed by a valve 51, normally held in closed position by coil spring 52 surrounding the valve stem 53. The disk 50 and valve 51 are mounted over the chamber 54 formed in the end of cylinder 16, which communicates with the tubing 17 leading to the brakes on the trailer. Mounted on the trailer is a supply tank or reservoir 55 containing hydraulic brake fluid, said tank connecting to cylinder 16 by means of the flexible tubing 56, said tubing leading into a passage 57 formed in the wall of cylinder 16, said passage communicating with the interior of cylinder 16 by means of the spaced lateral passages 58 and 59. The movement of piston 46 toward the right, as viewed in Fig. 2, is limited by means of a stop member 60 held in position by a snap ring 61.

The cylinder 16 is provided with several aligning pins, one of which is shown at 62 in Fig. 2. When the cylinder 16 is secured to the end of the cylinder 12 by means of the clamping member previously described, one of the aligning pins 62 enters into a bushing 63 threaded into the wall of cylinder 12 and contacts with the end of a stem or rod 64, movable in a passage 65. Said rod is normally forced toward the left as viewed in Fig. 2, by means of a coil spring 66 and when cylinder 16 is clamped against the end of cylinder 12, the aligning pin 62 contacts against the end of rod 64 and forces said rod toward the right against the tension of spring 66. The end of rod 64 when thus forced by pressure of pin 62, contacts with a ball or check valve 67 located in the end of the cylinder 12 in the passage 86 where the tube 14 connects to said cylinder. A bleeder plug 88 is located in a portion of said passage. Thus, while cylinder 16 is clamped on the end of cylinder 12, valve 67 is always held open so that fluid from the car braking system may enter cylinder 12. When the cylinder 16 is disconnected from cylinder 12, ball valve 67 is closed against its seat 68 and the supply of fluid from the braking system of the car into cylinder 12 is disconnected. When however, cylinder 16 is attached to the end of cylinder 12 the pin 62 contacting with rod 64 will open ball valve 67 permitting the brake fluid to enter through tube 14 into cylinder 12 and thereby exert pressure against the end of piston 41 in a manner to be explained.

From the foregoing, the operation of the improved braking system will be readily understood. When the trailer is uncoupled or disconnected from the car, cylinder 16 is disconnected from cylinder 12 and the end of cylinder 12 is then closed by a dust cap 70 shown in Fig. 6. Said dust cap 70 is held in position on the end of cylinder 12 by means of the clamp shown in Fig. 4. At this time, rod 64 is held away from the ball valve 67 by pressure of spring 66 and ball valve 67 is accordingly closed against seat 68 so that communication between cylinder 12 and the rest of the automobile braking system is shut off permitting the braking system of the car to operate in the conventional manner.

When the trailer is coupled to the car, cylinder 16 is clamped against the end of cylinder 12, shown in Fig. 2. At this time the aligning pin exerts pressure on the end of rod 64, causing said rod to open ball valve 67 and establish communication between cylinder 12 and the braking system of the car so that brake fluid may enter cylinder 12. Now, when the foot pedal 11 of the car is pressed, fluid will be forced through tube 14 into the end portion of cylinder 12 and against the end of piston 41 in said cylinder. The pressure of the braking fluid against piston 41 will cause said piston to be thrust to the left in Fig. 2 and its push rod 45 will similarly thrust piston 46 in cylinder 16 in the same direction. Cylinder 16 contains braking fluid supplied from reservoir or tank 55, and when piston 46 is thrust to the left by pressure of rod 45, the pressure of fluid against the inner end of valve 51 will cause said valve to open so that the fluid will be forced through chamber 54 into tube 17 and accordingly through the tubes 18 leading to the brakes on the wheels 19 of the trailer. Upon release of pressure on the foot pedal 11, springs 47 and 42 will force the respective pistons 46 and 41 back to their former positions.

Through the mechanism described, it will be seen that the single pedal 11 will serve to simultaneously and synchronously apply the brakes of the automobile and the trailer.

In Fig. 5 is shown an arrangement for holding the brakes of the trailer in an applied position when the trailer is parked, and is disconnected from the car. There is shown a closure cap 75 provided near its periphery with hook-shaped members 76 which are clamped over the rib 32 on cylinder 16 by tightening up the wing nuts 77 mounted on the hooks 76. Said member 75 is formed with a central opening 78 which receives a threaded rod 79, on the other end of which is mounted a cap 80 and within which a sleeve 81 is contained. Mounted within said sleeve is a plunger 82 terminating in a rounded head 83 and surrounded by the spring 84. The outer end of threaded rod 79 receives an operating handle 85 pivoted at 86 to the end of rod 79. By means of handle 85 the rod 79 may be threaded inwardly or retracted, such movement causing the spring-pressed plunger 82 to bear with more or less resilient force upon the end of piston 46 to thereby force said piston toward the left, as viewed in Fig. 2, and cause the same to force the brake fluid through tubes 17 and 18 to the brakes on trailer wheels 19, to thereby apply the brakes. A locking nut 87 may be adjusted to the proper position on threaded rod 79 to hold the brakes in locked position. By loosening the wing nuts 77 on hook 76, the cap 75 and parts carried thereby can be quickly removed when it is desired to couple up the trailer and its brake system with the car and the cylinder 12 carried thereby.

From the foregoing, it will be obvious that the structure may be modified in many particulars without departing from the spirit of the invention. With the structure described, a very effective and safe braking system is provided wherein an application of both the brakes on the car and on the trailer is had simultaneously, yet the trailer may be speedily uncoupled from the car without in any way disturbing the braking system thereon.

What we claim is:

1. An apparatus of the character described comprising, an automotive trailer provided with fluid-operated brakes, a fluid-containing cylinder carried by the trailer, a piston therein for forcing fluid to the brakes, a cylinder carried by the car, said car cylinder having a piston and means connected thereto for causing the piston in the car cylinder to move the piston in the trailer cylinder, a valve for controlling the flow of fluid into the car cylinder, means for automatically holding said valve in closed position while the car cylinder is not connected to the trailer cylinder, and means carried by the trailer cylinder for causing said valve to be opened when the trailer cylinder is coupled to the car cylinder and holding it in open position as long as the trailer cylinder is so coupled.

2. An apparatus of the character described comprising, two cylinders, a piston within each of said cylinders, means for joining said cylinders with their normally open ends adjacent to one another, means on one of the pistons for moving the other when the first piston is moved by fluid pressure, a valve in the cylinder in which the first piston is located for controlling the flow of braking fluid into said cylinder, spring means for normally holding said valve closed while said cylinder is uncoupled from the other cylinder, and means carried by the last mentioned cylinder for opening said valve against said spring pressure when said last mentioned cylinder is coupled with the first cylinder and holding it open as long as the two cylinders are coupled to one another.

GILBERT VALERY.
WM. VALERY.